(12) United States Patent
Hecht et al.

(10) Patent No.: US 7,607,359 B2
(45) Date of Patent: Oct. 27, 2009

(54) ULTRASONIC FLOW RATE METER HAVING A PRESSURE SENSOR

(75) Inventors: Hans Hecht, Stuttgart (DE); Roland Mueller, Steinheim (DE); Uwe Konzelmann, Asperg (DE); Tobias Lang, Stuttgart (DE); Sami Radwan, Stuttgart (DE)

(73) Assignee: Roberst Bosch GmbH, Stuttgart (DE)

( * ) Notice: Subject to any disclaimer, the term of this patent is extended or adjusted under 35 U.S.C. 154(b) by 0 days.

(21) Appl. No.: 11/793,666

(22) PCT Filed: Aug. 26, 2005

(86) PCT No.: PCT/EP2005/054208

§ 371 (c)(1),
(2), (4) Date: Mar. 19, 2008

(87) PCT Pub. No.: WO2006/066982

PCT Pub. Date: Jun. 29, 2006

(65) Prior Publication Data

US 2008/0271543 A1    Nov. 6, 2008

(30) Foreign Application Priority Data

Dec. 21, 2004    (DE) .................... 10 2004 061 404

(51) Int. Cl.
   *G01F 1/66*    (2006.01)
(52) U.S. Cl. .................................................. 73/861.27

(58) Field of Classification Search ............... 73/861.28, 73/198, 861.27, 861.25, 861.26, 861.29, 73/861.3, 861.31
See application file for complete search history.

(56) References Cited

U.S. PATENT DOCUMENTS

| 5,040,415 | A | * | 8/1991 | Barkhoudarian | ............. 73/198 |
| 5,546,813 | A |   | 8/1996 | Hastings et al. | |
| 6,053,054 | A | * | 4/2000 | Wusterbarth et al. | ...... 73/861.28 |
| 6,550,345 | B1 | * | 4/2003 | Letton | ...................... 73/861.27 |

FOREIGN PATENT DOCUMENTS

| CN | 1091519 | 8/1994 |
| DE | 197 13 526 | 10/1998 |
| EP | 0 477 418 | 4/1992 |
| EP | 1 094 305 | 4/2001 |

\* cited by examiner

*Primary Examiner*—Jewel Thompson
(74) *Attorney, Agent, or Firm*—Kenyon & Kenyon LLP

(57) ABSTRACT

An ultrasonic flow rate meter and a method for measuring the flow rate with the aid of ultrasound are described, having at least two ultrasonic transducers situated offset in a flow channel in the flow direction for transmitting and receiving ultrasound wave packets, so that ultrasound propagation times from one of the ultrasonic transducers to the other, and vice-versa, can be determined in an electronic part, and having a pressure sensor associated with the flow channel for determining the pressure in the flow channel. Measured values for an engine control that is as accurate as possible are determinable by accurately detecting the incoming air in the intake of a motor vehicle internal combustion engine.

20 Claims, 2 Drawing Sheets

ULTRASONIC FLOW RATE METER HAVING A PRESSURE SENSOR

FIELD OF THE INVENTION

The present invention relates to an ultrasonic flow rate meter having a pressure sensor For measuring the flow rate of a fluid, in particular of a gas, for example of air, through a flow channel with the aid of ultrasound, at least two ultrasonic transducers are situated offset in the flow direction for transmitting and receiving ultrasound packets, so that ultrasound propagation times through the flowing fluid from one ultrasonic transducer to the other and vice-versa are determinable. The sound velocity in the fluid and the average flow velocity of the fluid may be calculated from the measured signal values of the propagation times combined with geometric quantities of the measuring system.

BACKGROUND INFORMATION

For example, European Published Patent Application No. 0 477 418 describes an ultrasonic flow rate meter which is suitable for installation in a measuring pipe through which a fluid flows, in particular for measuring air mass in a motor vehicle engine. Two ultrasonic transducers operate alternatingly as transmitting or receiving transducers; however, the emitted ultrasound waves travel via a reflector system along a measuring path through the measuring pipe between the ultrasonic transducers. The individual modules are preferably integrated with an operating and measuring electronic unit on a circuit board as a built-in unit which may be installed sealed in a receptacle opening of the measuring pipe.

SUMMARY

According to example embodiments of the present invention, an ultrasonic flow rate meter has at least two ultrasonic transducers in a flow channel conducting a fluid flow, situated offset in the flow direction; these transducers transmit ultrasound signals or ultrasound wave packets to each other alternatingly or simultaneously to measure the flow rate of the fluid or medium, a gaseous medium in particular. The ultrasound propagation times from one of the ultrasonic transducers to the other and vice-versa along a path through the flowing fluid in the flow channel are determinable in an electronic part. A pressure sensor for determining the pressure in the flow channel is assigned to the flow channel, more precisely the spatial region of the flow channel in which the ultrasound propagation times are measured. In other words, the pressure sensor is situated such that the pressure is measured in the flow channel, in particular in the region in which the ultrasound wave packets propagate, i.e., the flow rate, the mass flow, or the particle flow is determined. In particular, the pressure sensor may be installed, mounted, attached, or integrated in or on the electronic part of the ultrasonic flow rate meter. The pressure prevailing in the flow channel may be transferred to the pressure sensor via a channel or a bore hole in the flow channel, so that the density of the flowing fluid is approximately ascertainable. The ultrasonic flow rate meter may also be referred to as an ultrasonic flow meter.

The ultrasonic flow rate meter and the method for flow rate measurement via ultrasound in a flow channel may be used for accurately detecting the incoming air in the intake of a motor vehicle internal combustion engine to determine measured values for an engine control that is as accurate as possible.

A further advantage of the associated, attached, or integrated pressure sensor is the possibility to multiply the ascertained pressure value by the ascertained difference in propagation times between the two directions of transmission between the at least two ultrasonic transducers already in the electronic part or in the analyzer unit of the ultrasonic flow rate meter. The measured quantity thus ascertained is a good approximation for the mass flow or the particle flow in the fluid flow which flows through the flow channel.

Due to the largely linear characteristic curve of the ultrasonic flow rate meter, the ultrasonic flow rate meter and the method of integrated or simultaneous measurement and computation of the measured ultrasound propagation time signals and pressure signals may be used in particular even in the case of pulsating flows. Already in the electronic part, the measured quantities ascertained from the measuring signals may be subjected to low-pass filtering, which averages them, and then further transmitted at a reduced band width without thus reducing the measuring accuracy.

Due to a drawn-back position of the pressure sensor which is connected to the flow channel via a channel or a bore hole, the pressure sensor is advantageously protected against contamination.

Further features and aspects of example embodiments of the present invention are described in more detail below with reference to the appended Figures.

DETAILED DESCRIPTION

Figure 1:
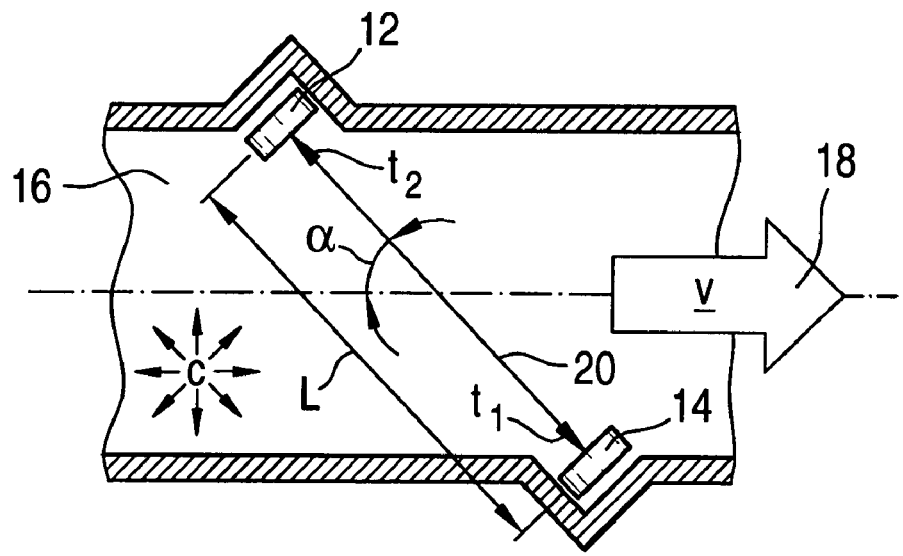
FIG. 1 schematically shows a typical measuring system for the ultrasound propagation times through the flowing fluid in the ultrasonic flow rate meter according to an example embodiment of the present invention.

FIG. 1 schematically shows a typical measuring system for the ultrasound propagation times through the flowing fluid in the ultrasonic flow rate meter according to an example embodiment of the present invention. Before describing a number of specific advantages and aspects of example embodiments of the ultrasonic flow rate meter according to the present invention, the conventional measuring system for the ultrasound propagation times shall be described as such. In a flow channel 16, here in FIG. 1 in the form of a pipe, a first and a second ultrasonic transducer 12, 14 are mounted offset with respect to each other in flow direction 18. In other words, first ultrasonic transducer 12 is located upstream, and second ultrasonic transducer 14 is located downstream. A fluid, in particular a gas, or a gas mixture such as, for example, air, flows through flow channel 16 in flow direction 18 at flow velocity v. The fluid has a sound velocity c. The two ultrasonic transducers 12, 14 alternatingly or simultaneously transmit ultrasound wave packets to each other along a measuring path 20 having path length L through the flowing fluid. At least in one projection, measuring path 20 extends parallel or antiparallel to flow direction 18. Here in FIG. 1, measuring path 20 and flow direction 18 form an angle α. Ultrasound propagation times $t_1$ from first ultrasonic transducer 12 to second ultrasonic transducer 14 and $t_2$ from second ultrasonic transducer 14 to first ultrasonic transducer 12 are measured. Ultrasound propagation times $t_1$ and $t_2$ differ slightly compared to the absolute value of their arithmetic mean due to the movement of the fluid in flow direction 18.

Figure 2:
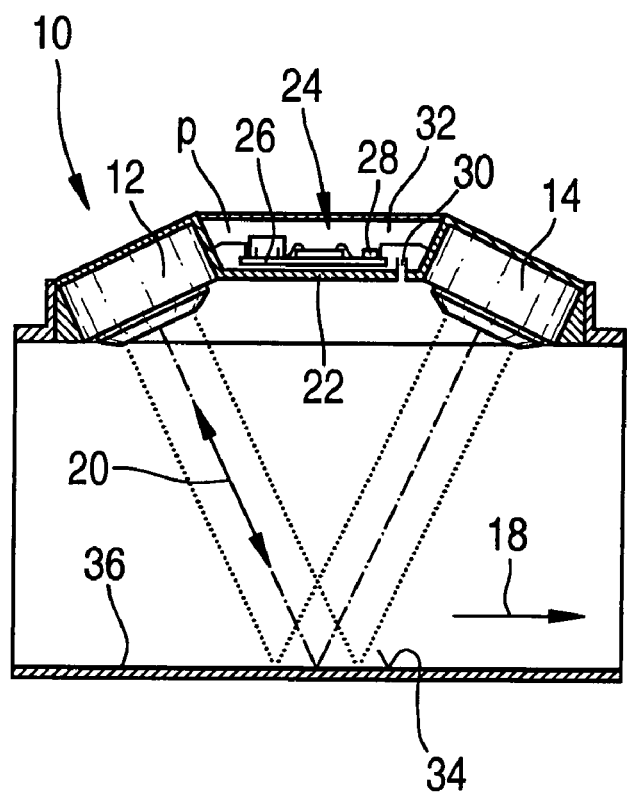
FIG. 2 shows an ultrasonic flow rate meter according to an example embodiment of the present invention.
Figure 3:
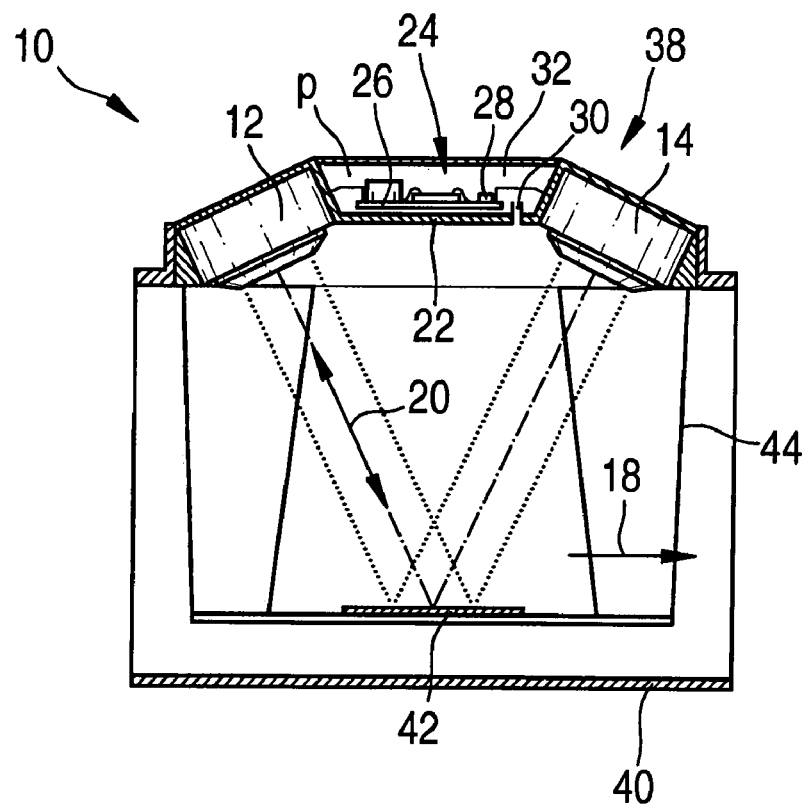
FIG. 3 shows a variant of the ultrasonic flow rate meter according to an example embodiment of the present invention, which is arranged as a plug-in sensor unit.
Figure 4:
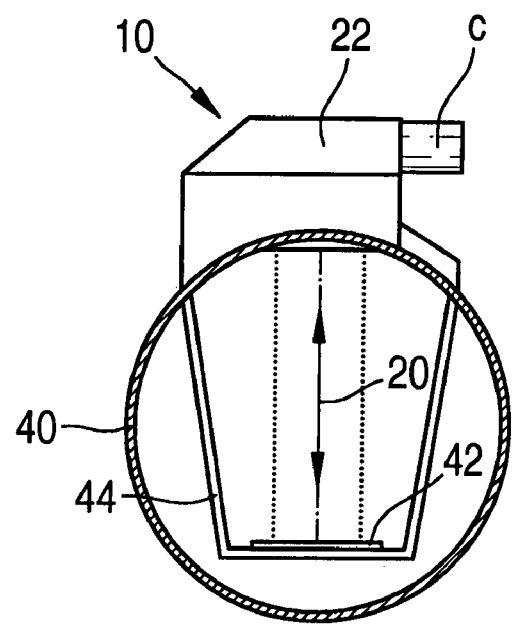
FIG. 4 shows a cross section through a flow channel in which the ultrasonic flow rate meter according to FIG. 3 is mounted.

According to example embodiments of the present invention, in the region of flow channel 16 in which the ultrasound propagation times are determined, the pressure of the fluid is additionally measured (not shown in greater detail in FIG. 1, see FIGS. 2 through 4). This results in measured values for the propagation time difference $\Delta t = t_1 - t_2$, the propagation time sum $\Sigma t = t_1 + t_2$, and pressure p being available within an electronic part or an analyzer unit—the electronic part may also be located remotely from the measurement site—for an advantageous, compact or integrated system (see FIGS. 2 and 3). With the abbreviated notation of a correction factor $s = 1 - (\Delta t / \Sigma t)^2$, after a short calculation, the following relationships result for sound velocity c in the fluid:

$$c = 2L \frac{1}{\Sigma t} \frac{1}{s} \quad (1)$$

and mean flow velocity v $$v = \frac{2L}{\cos \alpha} \frac{\Delta t}{(\Sigma t)^2} \frac{1}{s} \quad (2)$$

Particle flow $\dot{n} = dn/dV \, dV/dt$, proportional to the mass flow, may also be represented with the aid of the general gas equation $pV = nkT$, where V is the volume, n is the number of particles, k is Boltzman's constant, and T is the temperature, and the proportionality $v \propto dV/dt$ between flow velocity v and the volumetric flow rate dV/dt as $$\dot{n} \propto v(P/T) \quad (3)$$

With the equation $c^2 = \kappa RT$, where $\kappa$ is the adiabatic exponent, the following equation is obtained:

$$\dot{n} \propto p \cdot \Delta t \cdot g \quad (4)$$

where $g = \kappa s$ is a correction factor which may be represented as a function of v, T, and the relative air moisture. Correction factor g may be set as 1 (or neglected). When ascertaining the particle flow or the mass flow, only a certain error is made, which increases with increasing temperature and air moisture, but is irrelevant in many applications. In other words, the product of pressure and propagation time difference is proportional to the particle flow and is therefore a measure of the mass flow which is again proportional to the particle flow.

If measured pressure p and difference in propagation time $\Delta t$ are represented within the electronic part (also an analyzer unit) via a linear relationship as an electrical signal, both signals may be processed by multiplying them to form a resulting signal (in a multiplication unit of the electronic part, not represented graphically), which approximately represents the mass flow. This signal, when it refers to the mass flow in the intake of a motor vehicle internal combustion engine, may be used for the engine's control or regulation.

FIG. 2 shows an ultrasonic flow rate meter 10 according to an example embodiment of the present invention. In a flow channel 16, here in this example embodiment in the form of a flow pipe, a first and a second ultrasonic transducer 12, 14 are mounted offset with respect to each other in flow direction 18.

Ultrasonic transducers 12, 14 send each other ultrasound signals, in particular ultrasound wave packets. Ultrasonic transducers 12, 14 are suitable for both transmitting and receiving, i.e., they may convert both electrical signals into ultrasound and ultrasound into electrical signals. After transmitting an ultrasound wave packet, each of ultrasonic transducers 12, 14 is used for receiving an ultrasound wave packet coming from the other ultrasonic transducer 12, 14. According to a geometry such as shown in FIG. 1, the ultrasound wave packets may pass directly from one ultrasonic transducer 12, 14 to the other through the flowing fluid. According to FIG. 2, the ultrasound wave packets are mirrored on a reflecting surface 34 on pipe inner wall 36 of flow channel 16, which reflects ultrasound waves; ultrasonic transducers 12, 14 are located on one side of flow channel 16. Measuring path 20, through which the ultrasound wave packets travel, is not perpendicular to flow direction 18. Although measuring path 20 may extend parallel or antiparallel to flow direction 18 in principle, in an ultrasonic flow rate meter 10 according to an example embodiment of the present invention, it is provided that at least in some sections measuring path 20 extend inclined at an angle to flow direction 18. Measuring path 20 may also have a number of sections which form different angles with flow direction 18. As illustrated in FIG. 2, measuring path 20, as the dashed line shows, extends in a V shape in two sections, which are situated mirror-symmetrically with respect to a plane of a flow channel cross section, inclined to the flow direction. The dotted lines schematically represent the dimension of the ultrasound wave packets in the lateral direction with respect to their direction of propagation.

According to FIG. 2, the two ultrasonic transducers are integrated in a compact receptacle part. An electronic part 24 is also installed between the first (upstream) and second (downstream) ultrasonic transducer 12, 14 on compact receptacle part 22. Electronic part 24 is used, among other things, for generating the electrical signals for ultrasonic transducers 12, 14, such that ultrasound wave packets are generated, for processing the resulting electrical signals on the basis of the received ultrasound wave packets, for propagation time measurement of the ultrasound wave packets (propagation time—at least in projection—in flow direction 18 and propagation time—at least in projection—against flow direction 18), and for processing the measured values to form an electrical signal, which represents the mass flow. Due to the offset arrangement of ultrasonic transducers 12, 14 in flow direction 18, the propagation times from the first to the second and vice-versa differ as a function of flow velocity v. Electronic part 24 has a circuit support 26, which includes a pressure sensor (or a pressure transducer) 28. Other, preferably all, necessary circuit components of ultrasonic flow rate meter 10 are mounted on or attached to circuit support 26.

The compact receptacle part has an internal region 32, in which circuit support 26 having pressure sensor 28 is located, internal region 32 being connected to flow channel 16 by a channel 30, here in this example embodiment a bore hole. When pressure sensor 28 measures the pressure in internal region 32, the pressure in flow channel 16 is thereby determined. Channel 30 may be an open channel 30 as shown here in FIG. 2 or, alternatively, it may be a channel 30 covered by a movable diaphragm, so that while the pressure is relayed into internal region 32, contaminants are kept away from electronic part 24 and pressure sensor 28.

FIG. 3 represents a variant of the example embodiment of FIG. 2 of ultrasonic flow rate meter 10, which is arranged as a plug-in sensor unit 38. The geometry of this variant is substantially identical to that shown in FIG. 2, so that for the explanation of the reference numerals introduced in FIG. 3 reference is made to the above description of FIG. 2. The ultrasonic flow rate meter shown in FIG. 3 is arranged as plug-in sensor unit 38. Plug-in sensor unit 38 has such a geometry that it may be mounted/onto an additional recess in the flow channel, here flow pipe 40, sealingly or sealed, virtually as a cover for the recess. Plug-in sensor unit 38 includes, in addition to compact receptacle part 22 already mentioned, a holding construction 44, which, in the installed state, projects into the fluid flowing in flow pipe 40. Holding construction 44 carries a reflecting layer 42, which mirrors the ultrasound wave packets emitted by ultrasonic transducers 12, 14 along measuring path 20.

FIG. 4 shows a cross section through flow pipe 40, in which the alternative variant of ultrasonic flow rate meter 10 according to FIG. 3 is mounted. For explanation of the reference numerals introduced, reference is made to the above description of FIG. 3.

LIST OF REFERENCE CHARACTERS 10 ultrasonic flow rate meter
12 first ultrasonic transducer
14 second ultrasonic transducer
16 flow channel
18 flow direction
20 measuring path
22 compact receptacle part
24 electronic part
26 circuit support
28 pressure sensor
30 channel
32 internal region
34 reflecting surface
36 pipe inner wall
38 plug-in sensor unit
40 flow pipe
42 reflecting layer
44 holding construction
v flow velocity
c sound velocity in the fluid
L path length

What is claimed is:

1. An ultrasonic flow rate meter comprising:
an electronic part;
at least two ultrasonic transducers arranged in a flow channel, offset in a flow direction, configured to transmit and receive ultrasound wave packets, so that ultrasound propagation times from one of the ultrasonic transducers to the other and vice-versa are determinable in the electronic part; and
a pressure sensor configured to determine pressure in the flow channel associated with the flow channel;
wherein the pressure sensor is located in an internal region within the ultrasonic flow rate meter, the internal region connected to the flow channel via one of (a) an open channel and (b) a channel sealed by a movable diaphragm.

2. The ultrasonic flow rate meter according to claim 1, wherein the ultrasonic transducers are arranged such that the ultrasound wave packets are transmitted from one of the ultrasonic transducers to the other and vice-versa via at least one reflecting surface in the flow channel.

3. The ultrasonic flow rate meter according to claim 2, wherein the reflecting surface is at least one of (a) part of a pipe inner wall of the flow channel, (b) a reflection layer attached to the pipe inner wall and (c) a reflection plate.

4. The ultrasonic flow rate meter according to claim 1, wherein the electronic part is configured to generate an electrical signal representing the measured pressure and an electrical signal representing a difference between the ultrasound propagation times, the electronic part including a multiplication unit configured to process the electrical signals into a signal approximately representing the mass flow.

5. The ultrasonic flow rate meter according to claim 1, wherein the ultrasonic flow rate meter is configured as a plug-in sensor unit for an intake of a motor vehicle internal combustion engine.

6. An ultrasonic flow rate meter comprising:
an electronic part;
at least two ultrasonic transducers arranged in a flow channel, offset in a flow direction, configured to transmit and receive ultrasound wave packets, so that ultrasound propagation times from one of the ultrasonic transducers to the other and vice-versa are determinable in the electronic part; and
a pressure sensor configured to determine pressure in the flow channel associated with the flow channel;
wherein the ultrasonic transducers and the pressure sensor are integrated with the electronic part one of (a) in and (b) on a compact receptacle part.

7. The ultrasonic flow rate meter according to claim 6, wherein the ultrasonic transducers are arranged such that the ultrasound wave packets are transmitted from one of the ultrasonic transducers to the other and vice-versa via at least one reflecting surface in the flow channel.

8. The ultrasonic flow rate meter according to claim 7, wherein the reflecting surface is at least one of (a) part of a pipe inner wall of the flow channel, (b) a reflection layer attached to the pipe inner wall and (c) a reflection plate.

9. The ultrasonic flow rate meter according to claim 6, wherein the electronic part is configured to generate an electrical signal representing the measured pressure and an electrical signal representing a difference between the ultrasound propagation times, the electronic part including a multiplication unit configured to process the electrical signals into a signal approximately representing the mass flow.

10. The ultrasonic flow rate meter according to claim 6, wherein the ultrasonic flow rate meter is configured as a plug-in sensor unit for an intake of a motor vehicle internal combustion engine.

11. An ultrasonic flow rate meter comprising:
an electronic part;
at least two ultrasonic transducers arranged in a flow channel, offset in a flow direction, configured to transmit and receive ultrasound wave packets, so that ultrasound propagation times from one of the ultrasonic transducers to the other and vice-versa are determinable in the electronic part; and
a pressure sensor configured to determine pressure in the flow channel associated with the flow channel;
wherein the electronic part:
is configured to generate an electrical signal representing the measured pressure and an electrical signal representing a difference between the ultrasound propagation times;
includes a multiplication unit configured to process the electrical signals into a signal approximately representing the mass flow; and
includes a low-pass filter acting upon the signal representing the mass flow.

12. The ultrasonic flow rate meter according to claim 11, wherein the ultrasonic transducers are arranged such that the ultrasound wave packets are transmitted from one of the ultrasonic transducers to the other and vice-versa via at least one reflecting surface in the flow channel.

13. The ultrasonic flow rate meter according to claim 12, wherein the reflecting surface is at least one of (a) part of a pipe inner wall of the flow channel, (b) a reflection layer attached to the pipe inner wall and (c) a reflection plate.

14. The ultrasonic flow rate meter according to claim 11, wherein the ultrasonic flow rate meter is configured as a plug-in sensor unit for an intake of a motor vehicle internal combustion engine.

15. An ultrasonic flow rate meter comprising:
an electronic part;
at least two ultrasonic transducers arranged in a flow channel, offset in a flow direction, configured to transmit and receive ultrasound wave packets, so that ultrasound propagation times from one of the ultrasonic transducers to the other and vice-versa are determinable in the electronic part; and
a pressure sensor configured to determine pressure in the flow channel associated with the flow channel;
wherein the pressure sensor and other circuit components of the electronic part of the ultrasonic flow rate meter are arranged on a circuit support.

16. The ultrasonic flow rate meter according to claim 15, wherein the ultrasonic transducers are arranged such that the ultrasound wave packets are transmitted from one of the ultrasonic transducers to the other and vice-versa via at least one reflecting surface in the flow channel.

17. The ultrasonic flow rate meter according to claim 16, wherein the reflecting surface is at least one of (a) part of a pipe inner wall of the flow channel, (b) a reflection layer attached to the pipe inner wall and (c) a reflection plate.

18. The ultrasonic flow rate meter according to claim 15, wherein the electronic part is configured to generate an electrical signal representing the measured pressure and an electrical signal representing a difference between the ultrasound propagation times, the electronic part including a multiplication unit configured to process the electrical signals into a signal approximately representing the mass flow.

19. The ultrasonic flow rate meter according to claim 15, wherein the ultrasonic flow rate meter is configured as a plug-in sensor unit for an intake of a motor vehicle internal combustion engine.

20. A method for measuring the flow rate in a flow channel with ultrasound, comprising:
transmitting and receiving ultrasound wave packets by at least two ultrasonic transducers arranged in the flow channel offset in a flow direction;
determining, in an electronic part, ultrasound propagation times from one of the ultrasonic transducers to the other, and vice-versa;
measuring pressure in the flow channel by a pressure sensor;
generating, by the electronic part, an electrical signal representing the measured pressure and an electrical signal representing a difference between the ultrasound propagation times;
processing, by a multiplication unit of the electronic part, the electrical signals into a signal approximately representing the mass flow; and
acting, by a low-pass filter, upon the signal representing the mass flow.

* * * * *